Aug. 11, 1931.  P. S. STEVENS  1,818,106
EXCAVATING MACHINERY
Filed April 26, 1926   5 Sheets-Sheet 3

Paul S. Stevens,
INVENTOR.

BY Hoar & Ruhloff
ATTORNEYS.

Aug. 11, 1931.　　　P. S. STEVENS　　　1,818,106
EXCAVATING MACHINERY
Filed April 26, 1926　　5 Sheets-Sheet 4

Paul S. Stevens,
INVENTOR.
BY Hoar & Ruhloff
ATTORNEYS.

Patented Aug. 11, 1931

1,818,106

UNITED STATES PATENT OFFICE

PAUL S. STEVENS, OF SOUTH MILWAUKEE, WISCONSIN, ASSIGNOR TO BUCYRUS-ERIE COMPANY, OF SOUTH MILWAUKEE, WISCONSIN, A CORPORATION OF DELAWARE

EXCAVATING MACHINERY

Application filed April 26, 1926. Serial No. 104,623.

The invention relates to excavating machinery, such as dredges and power shovels, in which the various independent motions, such as propelling, dipper-hoisting, spud-hoisting, etc., are performed by electric motors, and more particularly to that class of such machines in which these motions are controlled according to the well-known Ward Leonard system.

In this system, each of said motors is energized by an electric generator, the generator being driven at approximately constant speed by any convenient source of mechanical power, which may, for example, be a Diesel engine. The essential principle of the Ward Leonard system is that the speed of the motor is controlled by varying the generator field current.

The chief disadvantage of this system of control, as heretofore used, has been the high cost entailed by the fact that, for each separate motor, a separate generator has been employed. It is true that in the past one such generator has sometimes been employed to supply current simultaneously to more than one motor, but such motors have never been selectively coupled to the generator and controlled with complete independence. Thus the plurality of motors, which have in the past been sometimes supplied by a single Ward Leonard generator, may be regarded, so far as electrical hook-up is concerned, as constituting merely a single motor. Accordingly, for the sake of simplicity in the description and in drawing the claims, the word: "motor", will be used to mean either a single motor, or a plurality of motors operating simultaneously for a single purpose. And the words "plurality of motors" will be used to mean either a plurality of single motors or a plurality of groups of motors, all the motors of each group operating simultaneously for a single purpose.

One object of my invention is to reduce the number of generators required in excavating machines, by selectively driving more than one independent motor from one generator. To this end I propose to supply power from one generator to more than one motor, wherever the amount of power severally required by each of said motors is sufficiently near equality as to be economically supplied by one generator, while at the same time the character of the work to be performed by the several motors is such that no two of them are required to work at the same time. Thus, in a dredge, the dipper-hoist motor and the spud-hoist motor are never necessarily actuated at the same time; and as, in addition to this, they each require that about the same power shall be available, it is economical to drive them from the same generator.

Another object of my invention is to provide a control of the specified nature for each of such independent motors supplied by one generator, and, furthermore, to make the position of each such control independent of the position of all similar controls of motors that are supplied by the same generator.

It is also an object of my invention to interlock such controls so that, during such time as one of said motors is being actuated by said single generator, no other of said motors can be coupled to said generator.

It is also an object of my invention to interlock certain of said generators so that the combined power-demand upon the means which is employed to drive such generators cannot exceed a certain predetermined maximum, thus further reducing expense by limiting the necessary size of such means.

In the description which follows, other objects and advantages will be disclosed and exemplified, so as to be evident to one skilled in the art.

The invention consists in the novel parts and in the combinations and arrangements defined in the appended claims, and of which two embodiments are exemplified in the accompanying drawings, which are hereinafter described and explained.

Throughout, the same reference number is applied to the same or similar members.

Well-known details of structure, wiring, etc., since they form no part of this invention, have been everywhere omitted, wherever such omission will conduce to clearness.

Figure 1:
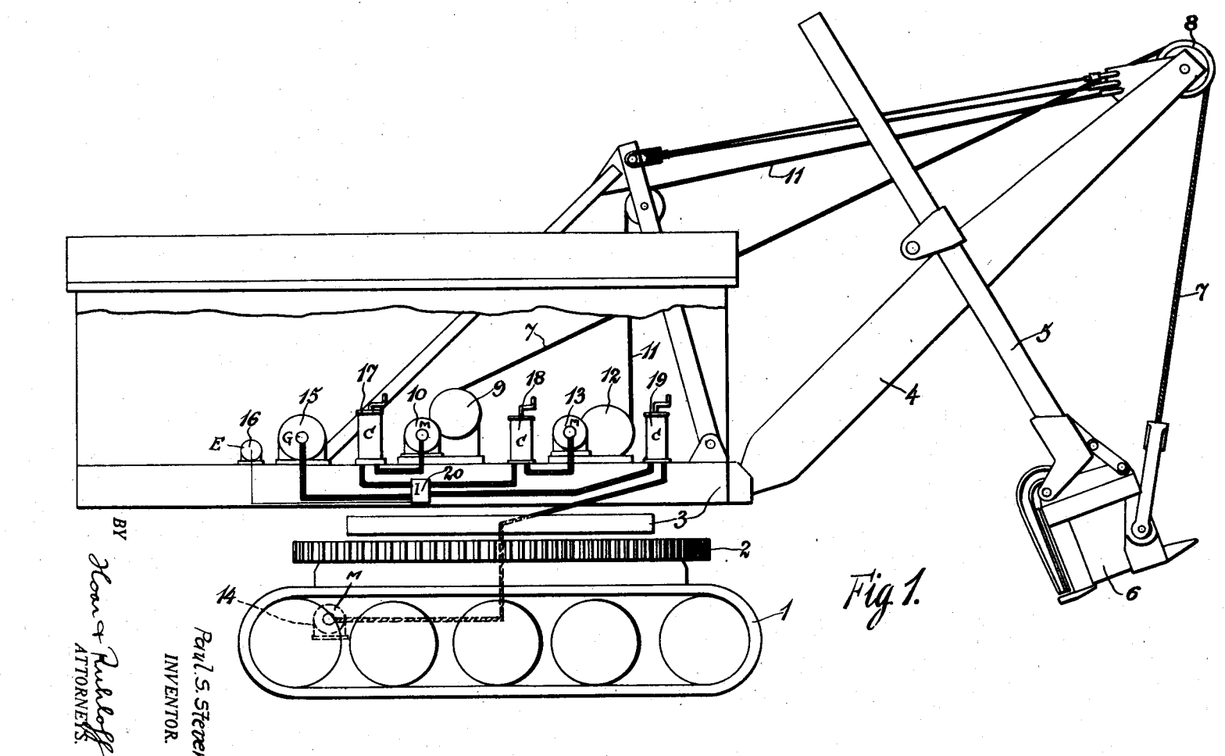
Figure 1 shows schematically my improvement as applied to certain of the motions of a power shovel.
Figure 2:
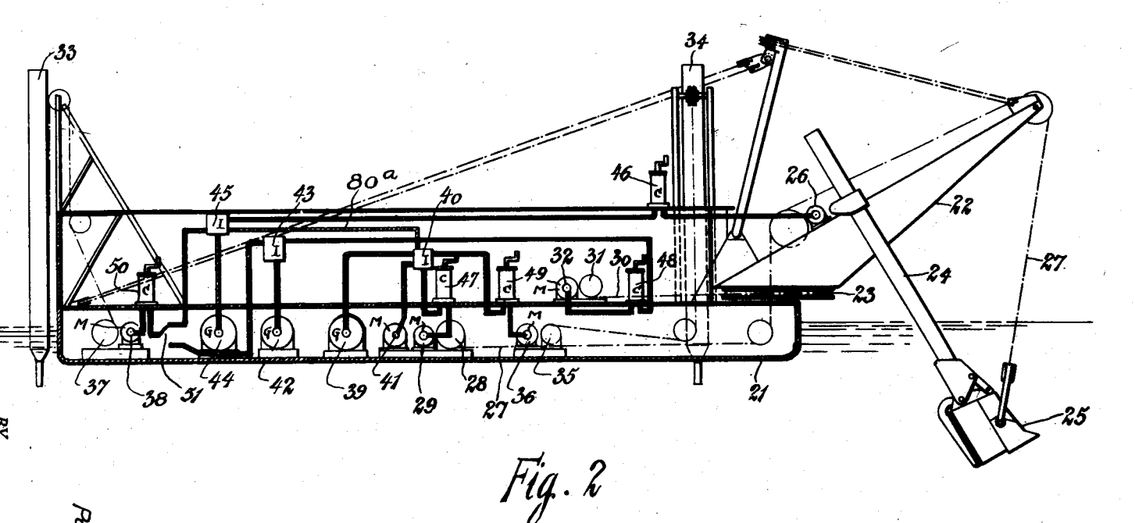
Figure 2 shows, also schematically, my improvement as applied to the motions of a dipper dredge.

While the various pieces of apparatus are given specific locations in Figures 1 and 2, it is to be understood that their actual locations are entirely arbitrary. This applies in particular to all exciters, generators, interlocks and controllers, quite regardless of the location of the particular motors which the said pieces of apparatus serve. While, therefore, the motors which actuate the several operated excavating elements are preferably placed so that each is relatively near the operated excavating element which it actuates, all other pieces of apparatus may be located wherever convenience dictates.

In Figure 1 is shown a shovel on a creeping traction mounting 1, which carries the usual rack 2, for the purpose of swinging a turntable 3. The swing pinion which is carried by the turntable and which engages the rack, is not shown, as it is not involved in my present invention; and, for the same reason, the swing motor, swing generator and swing control are not shown.

On the front end of the turntable 3 is mounted a boom 4, carrying a dipper handle 5 for swinging and reciprocating. The motor which effects this reciprocation is not shown, as it forms no part of my present invention; and, for the same reason, the thrust generator and thrust controller are not shown. Mounted on the end of the dipper handle is a digging dipper 6. The swinging of the dipper and handle is effected by hoist rope 7 which passes over a sheave 8 on the end of the boom, and thence to a dipper hoist winch 9 actuated by a dipper hoist motor 10.

The boom 4 is pivoted at its foot on the turntable 3, and its inclination is determined by boom hoist cable 11, which is wound on boom hoist winch 12 which in turn is actuated by boom hoist motor 13.

The propelling of the creeping traction mounting is effected by propelling motor 14, which may be conveniently positioned on the creeping traction mounting itself. In the case of plurality of propelling motors, this would be merely for convenience in attaching each of said motors to one of a plurality of creeping traction units, said motors being simultaneously and similarly governed by one and the same control; such motors thus constituting one "motor", as defined near the beginning of this specification.

The dipper hoist motor 10, the boom hoist motor 13, and the propelling motor 14 are selectively driven by one generator 15, in conjunction with its exciter 16. The three motors are respectively controlled by three controllers 17, 18 and 19, in a manner hereinafter set forth, and are interlocked in a manner hereinafter set forth by the interlocking device 20, so that no one of said three motors can be started if any other of said three motors is at the time being actuated.

Inasmuch as there is never any need, in an excavator of the type described, for the dipper hoist motor, the boom hoist motor, and the propelling motor or any two of them, to be actuated at one and the same time, it is evident that my invention, by providing a single generator and exciter for the motors associated with these three operated excavating elements, results in effecting a great economy, while at the same time preserving all the advantages of the well-known Ward Leonard control.

Figure 2 illustrates the application of the principles of my invention to a floating dredge, mounted on a hull 21. The boom 22 is mounted on the swing circle 23 and carries the dipper handle 24 and dipper 25, in much the same way as the boom 4, the dipper handle 5 and the dipper 6 are disposed in Figure 1.

The reciprocation of the dipper handle is effected by the thrust motor 26. The hoisting of the dipper is effected by the hoist cable 27, which is actuated by the dipper hoist winch 28 and dipper hoist motor 29.

The swing circle 23 is controlled by two ropes 30, which are actuated by swing winch 31 and swing motor 32.

To hold the dredge in position during digging, three spuds are lowered into engagement with the bottom of the body of water. One of these spuds 33 is positioned at the rear of the dredge, the other two spuds being positioned one on each side near the bow. Only one of these latter, 34, is shown. The two bow spuds are raised and lowered by a two-drum winch 35, actuated by a spud motor 36. The rear spud is raised and lowered by spud winch 37, actuated by spud motor 38.

There are three generators, each with its corresponding exciter and interlocking device. Each generator may be conveniently named by the principal operated excavating element which it controls. Thus we have the hoist generator 39, its interlocking device 40 and its exciter 41; the swing generator 42, and its interlocking device 43; and the thrust generator 44, and its interlocking device 45. It is to be understood that, with respect to the swing generator and the thrust generand each of these two generators has its own exciter (not shown).

Each of the motors above described is controlled by its appropriate controller. Thus we have a thrust controller 46 to control the thrust motor 26, a dipper hoist controller 47 to control the dipper hoist motor 29, a swing controller 48 to control the swing motor 32, a forward spud controller 49 to control the spud motor 36, and a rear spud controller 50 to control the rear spud motor 38.

Grouping the motors, so that they may be selectively actuated by as few generators as possible, without disturbing the normal operation of the dredge, we have the hoist generator 39 actuating the hoist motor 29 and the spud hoist motor 36; the swing generator 42 actuating the swing motor 32 and the spud motor 38; and the thrust generator 44 actuating the thrust motor 26 and the spud motor 38. It will be noted that provision is made whereby the spud motor 38 may be actuated by either the swing generator 42 or the thrust generator 44, according as one or the other of these generators is available, the spud controller 50 to be selectively coupled to one or the other of these generators by the manually operated switch 51.

In Figures 1 and 2 the various generators and exciters may be actuated by any convenient means of fairly constant speed, such as a Diesel engine, gasoline engine, steam engine, or electric motor, none of which means are herein shown, as their application is sufficiently obvious. It is not essential that each generator have its corresponding exciter. Thus, for example, one exciter may serve more than one generator and its motors; or the field of a generator may be self-excited and/or the generator may be employed to excite the fields of its motors; or, in case the primary source of power is direct current, the exciters, or some of them, may be dispensed with, as desired, this direct current being used for purposes of excitation.

My invention provides for a further saving of expense by a device which limits the necessary size of the rotating means referred to in the preceding paragraph. This is accomplished as follows. Whenever there exist in an excavating machine two motors (such as hoisting and thrusting), which can operate simultaneously by reason of being respectively served by two distinct generators, and which together will occasionally impose an excessive load upon said rotating means, I provide for limiting this load instead of building a rotating means sufficiently powerful to meet this load. Thereby considerable saving of expense is effected.

My method is to join hoist generator 39 and thrust generator 44 in Figure 2, in any manner well-known to those skilled in the art, as by an overload relay (not shown) and cable 80a, so that whenever the load on the thrust generator exceeds a certain predetermined figure, a resistance is automatically cut into the field circuit of the hoist generator, thereby so reducing its possible output, that the combined load will not exceed the capabilities of the primary power-source. This same feature is shown schematically in Figure 4, and in more detail in Figure 6.

But it is to be understood that my invention resides in the combination of this device with my other elements, rather than in any of the well-known electrical details of this device.

It is to be understood that, in my invention, I am not limited to any particular cataloging or grouping of motors. Other motors may be added to any one of the generators shown, or the grouping may be changed. For example, a boom hoist might be added to the dredge shown in Figure 2, in much the same manner as the boom hoist shown in Figure 1, and coupled with any convenient one of the generators. Furthermore, winches might be added for the control of the anchorage ropes of the dredge shown in Figure 2, although it is usual to employ one or more of the winches already described for this purpose, as well as for its main function.

Figure 3:
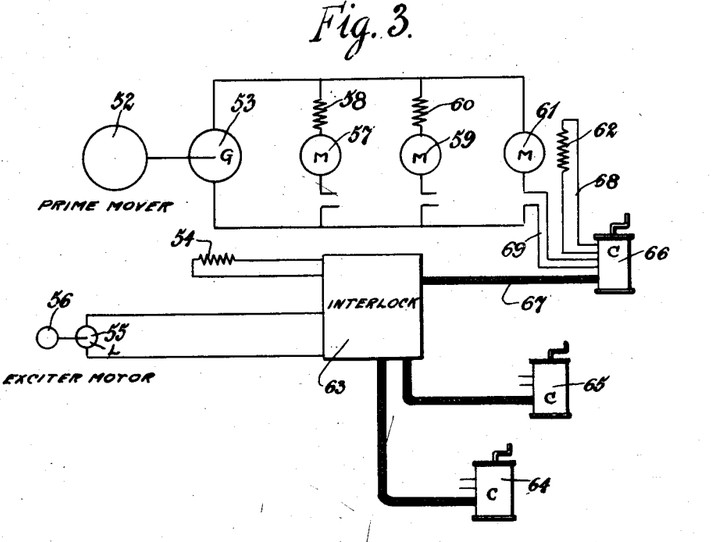
Figure 3 shows certain of the electrical connections for actuating and controlling a plurality of motors from one generator.

Figure 3 shows very schematically, one Ward Leonard system according to my invention. The prime mover 52 drives the generator 53 which has a separately excited field 54. An exciter 55, driven by exciter motor 56, supplies the current for exciting the generator field 54 and such of the motor fields as may be separately excited.

Three motors, actuated by generator 53, are shown. Of these, motor 57 is shown with a series field 58, motor 59 is shown with a series field 60, and motor 61 is shown with a separately excited shunt field 62; but it is to be understood that each of the motors may be of any sort having proper characteristics for the motion in question.

The interlocking device 63 may be of any convenient form known to those skilled in the art, whereby, if any one of the three motors is being actuated by the generator, to prevent any other of the three motors from being coupled to the generator.

Motors 57, 59 and 61 are respectively controlled by controllers 64, 65 and 66, only one of which will now be discussed, as representative of the three.

Controller 66 is coupled to the interlocking device 63 by a cable 67 containing the requisite number of electric wires to enable the controller to perform the functions hereinafter enumerated. The field circuit 68 and armature circuit 69 of the motor 61 pass through the controller 66. This controller may be of any convenient sort, well-known to those skilled in the art, whereby the following functions, or such of them as may be desirable, are performed:

(a) Closing armature circuit of the generator 53 and motor 61;

(b) Varying the field 54 of the generator 53 in typical Ward Leonard fashion;

(c) Reversing the motor 61;

(d) Varying the field 62 of the motor 61;

(e) Actuating the interlocking device so as to prevent the cutting in of any other motor while motor 61 is in operation, and to permit the cutting in of any other motor when the motor 61 is not in operation; and (f) Varying the resistance in the armature circuit if for any reason that should be desirable.

Figure 4:
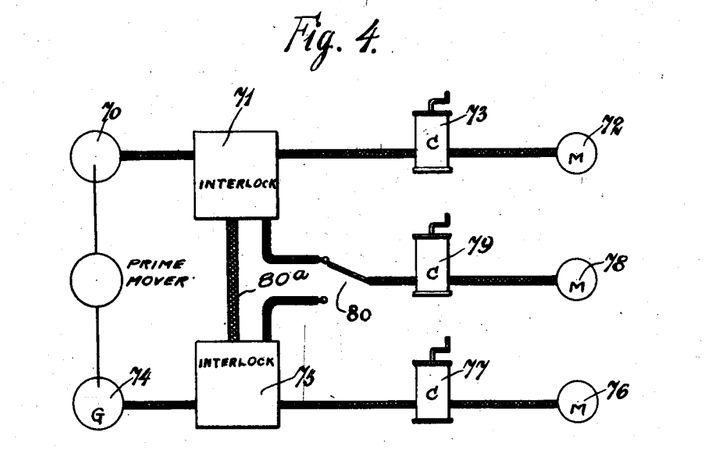
Figure 4 shows the installation necessary when it is desirable that one motor shall be capable of actuation by that one of a plurality of generators which is at the moment not supplying power to some other motor.

Figure 4 illustrates very schematically, the installation necessary when it is desirable that any one motor shall be capable of actuation by that one of a plurality of generators which is at the moment not suppling power to some other motor. This, it will be remembered, was the case with respect to spud motor 38 in the dredge of Figure 2. In Figure 4, generator 70 with its interlocking device 71 may actuate motor 72 through its controller 73; generator 74 with its interlocking device 75 may actuate motor 76 through its controller 77; and either generator may actuate motor 78 through its controller 79, this controller being selectively coupled to either of the two interlocking devices by means of the manually operated switch 80. Such of the circuits as it is not necessary to break by means of this switch may pass around it from the controller 79 to the interlocking device 71 or the interlocking device 75. Cable 80a connects the two interlocks 71 and 75, in the manner explained in the discussion of Figure 2. The prime mover for the two generators is indicated by the initials "P. M."

Figure 5:
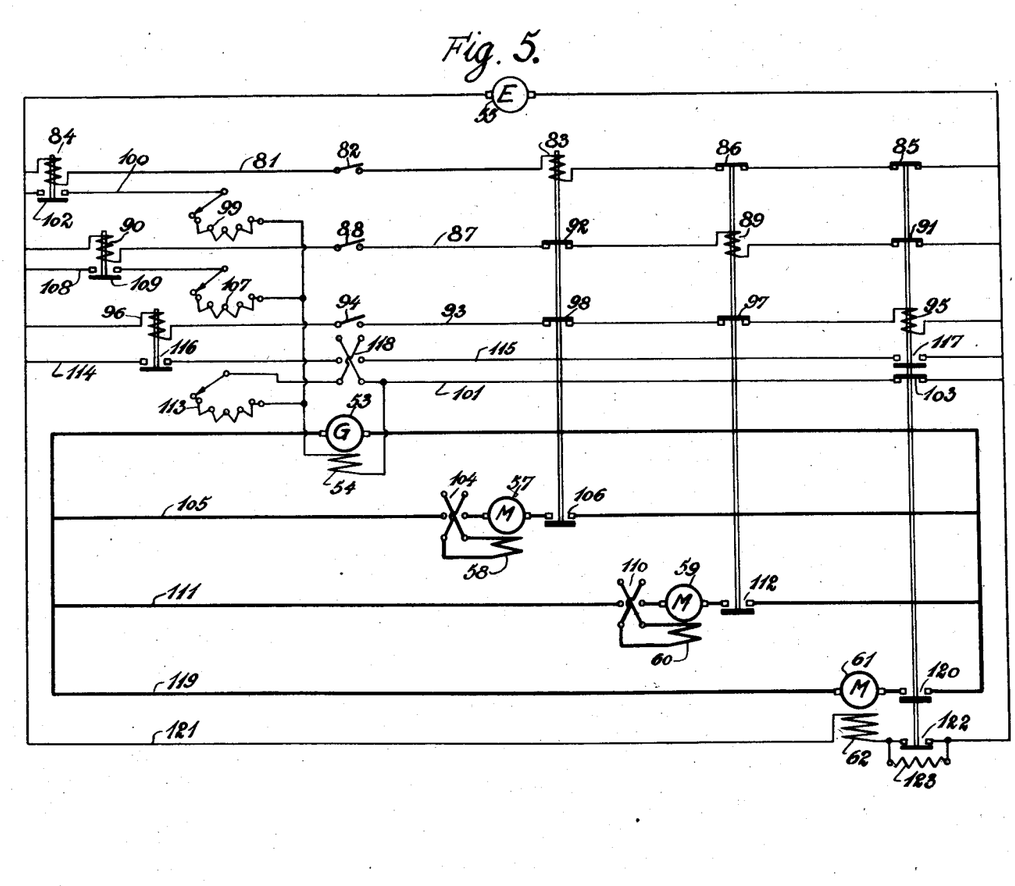
Figure 5 is an elementary electric wiring diagram of the device of Figure 3.

The device of Figure 3 has been diagrammed in Figure 5. Generator 53, its field 54, exciter 55, motor 57, its field 58, motor 59, its field 60, motor 61, and its field 62 are numbered as in Figure 3.

In Figure 5 all solenoids must be considered as acting upwardly when energized, and all relays are shown occupying their normal position with the solenoid unenergized. It will be noted that there are two electrical systems: one being shown with fine lines, and deriving its current from the exciter 55; and the other being shown with heavy lines, and deriving its current from the generator 53.

All solenoids and relays of Figure 5 are located in the interlock 63 of Figure 3. Each of the controllers 64, 65 and 66 of Figure 3 contains the rheostat, pilot switch and reversing switch of the corresponding motor. Each controller preferably has a handle which returns to neutral automatically, when released.

Motor 57 has a pilot line 81, capable of being closed by switch 82 (preferably located in the handle of controller 64, and closed by grasping the same), and passing through solenoids 83 and 84, and capable of being broken by relays 85 and 86. Switch 82 may well be arranged to open automatically, when released, and may well be mechanically interlocked with its controller-handle, so that switch 82 cannot be closed unless its controller-handle is in neutral. The solenoids should have sufficient resistance to prevent the exciter current from shorting through the pilot line. A single solenoid may be substituted for the two, which are here employed merely to simplify the wiring of the figure.

Similarly motor 59 has a pilot line 87, a handle-switch 88, solenoids 89 and 90, and relays 91 and 92.

Similarly motor 61 has a pilot line 93, a handle-switch 94, solenoids 95 and 96, and relays 97 and 98.

Rheostat 99 controls motor 57 by varying the field 54 of the generator 53, the current for this purpose coming through line 100, and returning through line 101. Line 100 may be closed by relay 102. Line 101 may be broken by relay 103. Motor 57, being a series motor, is reversed by reversing its field 58, by means of reversing-switch 104. The Ward Leonard generator circuit 105 to motor 57 is closable by relay 106.

With respect to motor 59, also a series motor, the same parts are played by rheostat 107, lines 108 and 101, relays 109 and 103, reversing-switch 110, generator circuit 111, and relay 112. It should be noted that return line 101 and relay 103 are common to the control of both motor 57 and motor 59.

Motor 61, being shunt, must be differently treated. Its rheostat 113 is served by line 114, and an independent return-line 115. This circuit may be closed by relays 116 and 117. To reverse this motor, the generator field 54 is reversed by reversing-switch 118. The generator circuit 119 to this motor is closable by relay 120. The shunt-field 62 of this motor is served by exciter circuit 121, closable by relay 122, which is provided with a by-pass resistance 123, to prevent arcing.

I shall illustrate the operation of this system by describing the functioning of only one of the motors. Assume that the operator of controller 64 wishes to run motor 57. Manipulation of controller 64, including rheostat 99 and reversing switch 104, will be ineffective unless handle-switch 82, which is a part of this controller, be first closed; for otherwise relay 102 will break the line to the rheostat, and relay 106 will break the generator circuit to motor 57. So that the first act of the operator must be to close handle-switch 82 by grasping the handle of the controller.

The closing of handle switch 82 energizes solenoids 83 and 84, thus closing relay 102 in the rheostat circuit 100, and opening relays 92 and 98 in pilot circuits 87 and 93 respectively. Rheostat 99 can now be used, and any attempt to use rheostats 107 and 113 is rendered ineffective, as relays 109, 116 and 117 will remain open and thus will isolate those rheostats from the generator field 54. Similarly relays 112, 120 and 122 will remain open, thus isolating motors 59 and 61, and their fields 60 and 62. Any attempt to close any of these relays by closing handle-switch 88 or 94 will be rendered nugatory by the breaks in pilot lines 87 and 93 at relays 92 and 98 respectively.

But, if either of the other motors is running, pilot line 81 will be broken at either relay 85 or 86 and the closing of handle-switch 82 will be ineffective.

The similar operation of controllers 65 and 66 should be readily evident.

Figure 6:
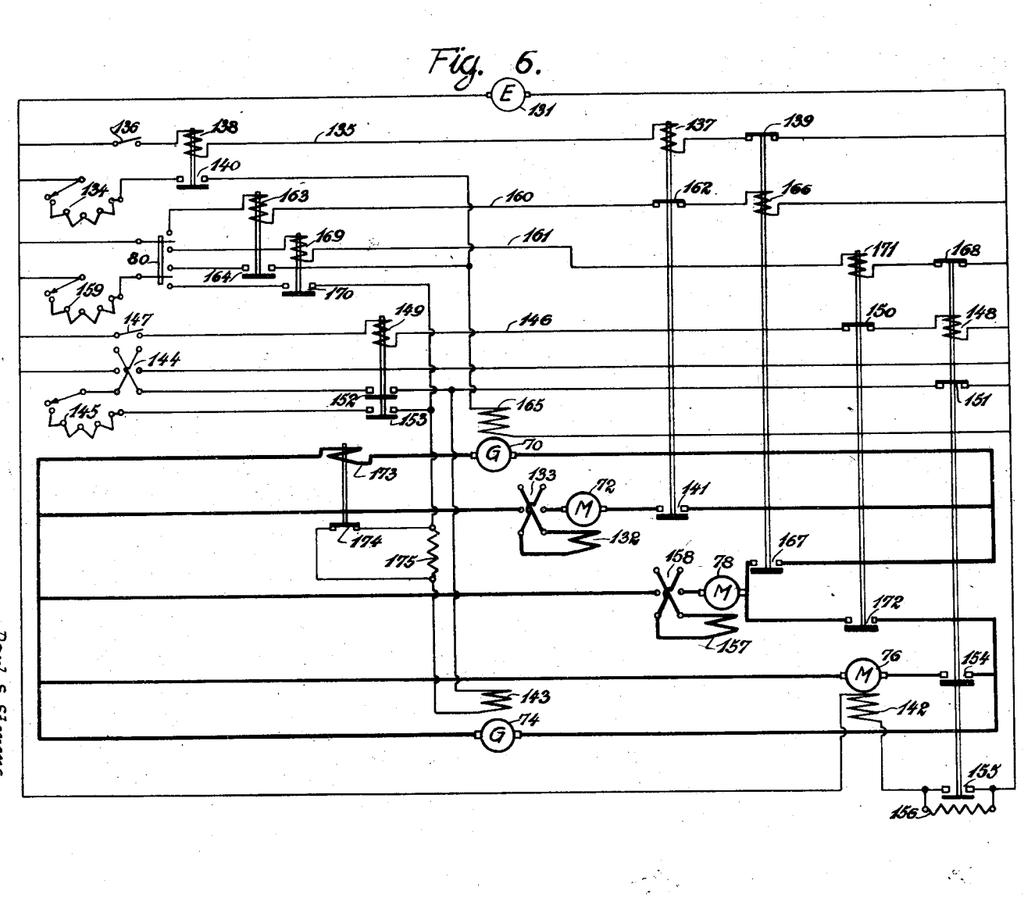
Figure 6 is an elementary electric wiring diagram of the device of Figure 4.

The device of Figure 4 has been diagrammed in Figure 6. Generators 70 and 74, motors 72, 76 and 78, and selective switch 80 are numbered as in Figure 4.

In Figure 6, as in Figure 5, all solenoids act upwardly when energized. In Figure 6 there are three electrical systems: one being shown with fine lines, and deriving its current from exciter 131; and the other two being shown with heavy lines, and deriving their current respectively from generator 70 or generator 74.

Motor 72 has a series field 132 and a reversing-switch 133. It is controlled by rheostat 134, pilot line 135, handle-switch 136, solenoids 137 and 138, and relays 139, 140 and 141, all of which operate as already explained with respect to Figure 5.

Motor 76 has a shunt-field 142 and is reversed by reversing the field 143 of generator 74 by means of reversing switch 144. It is controlled by rheostat 145, pilot line 146, handle-switch 147, solenoids 148 and 149, relays 150, 151, 152, 153, 154 and 155, and arcing resistance 156.

Motor 78 has a series field 157 and a reversing switch 158. It is controlled by rheostat 159. But, as it can be selectively served by either generator 70 or generator 74, it has two pilot lines 160 and 161.

When switch 80 is thrown up, and assuming that pilot-line 160 is not broken by relay 162 by virtue of motor 72 being in use, solenoid 163 closes relay 164, thus enabling rheostat 159 to control field 165 of generator 70, and at the same time solenoid 166 closes relay 167, thus putting motor 78 into the armature circuit of said generator. The opening of relay 139 prevents the use of motor 72.

On the other hand, when switch 80 is thrown down, and assuming that pilot-line 161 is not broken by relay 168 by virtue of motor 76 being in use, solenoid 169 closes relay 170, thus enabling rheostat 159 to control field 143 of generator 74, and at the same time solenoid 171 closes relay 172 thus putting motor 78 into the armature circuit of said generator. The opening of relay 150 prevents the use of motor 76.

Whenever generators 70 and 74 are both in use simultaneously, it is desirable to limit the load on the prime mover in the following manner. Whenever the load on generator 70 exceeds a certain predetermined figure, solenoid 173 opens relay 174 thereby cutting resistance 175 into the field circuit of generator 74, and thereby so reducing the possible output of that generator, that the combined load will not exceed the capabilities of the prime mover.

It is to be understood that controller 73 of Figure 4 includes handle-switch 136, rheostat 134, and reversing switch 133, all of Figure 6. Controller 79 includes switch 80, rheostat 159, and reversing switch 158. Controller 77 includes handle-switch 147, rheostat 145, and reversing switch 144. Interlock 71 includes solenoids 137, 138, 163, 166 and 173, and relays 141, 162, 140, 164, 139, 167 and 174. Interlock 75 includes solenoids 169, 171, 148 and 149, and relays 170, 150, 172, 168, 151, 154, 155, 152 and 153.

I claim:

1. In an excavating machine, the combination of: a generator; means for driving said generator; a plurality of motors; a controller for each motor, said controller being characterized by the fact that it is adapted to connect electrically its motor to the generator, to vary the field of the generator, and to reverse its motor, and interlocking means whereby, when one motor is being actuated, it is rendered impossible to couple any other motor to the generator.

2. In an excavating machine, the combination of: a generator; means for driving said generator; a plurality of motors; a controller for each motor, said controller being characterized by the fact that it is adapted to connect electrically its motor to the generator, to vary the field of the generator, and to reverse its motor, and interlocking means whereby it is rendered impossible to actuate more than one of said motors simultaneously by said generator.

3. In an excavating machine, the combination of: a first Ward Leonard generator; a second Ward Leonard generator; a first motor; a second motor; a third motor; means to couple the first motor to the first generator; means to couple the second motor to the second generator; means to couple the third motor selectively to either of the two generators; complete independent control means for each motor; means whereby the coupling of either the first or the third motor to the first generator will prevent the coupling of the other of those two motors to that generator; and means whereby the coupling of either the second or the third motor to the second generator will prevent the coupling of the other of those two motors to that generator.

4. In an excavating machine, the combination of: a Ward Leonard generator; means for driving said generator; and a plurality of motors selectively actuated by said generator and in parallel with respect to the generator, each motor being completely and independently controlled, such control including means for varying the resistance in the field circuit of the generator.

5. In an excavating machine, the combination of: a Ward Leonard generator; means for driving said generator; and a plurality of motors selectively actuated by said generator and in parallel with respect to the generator, each motor being completely and independently controlled.

6. In an excavating machine, the combination of: a Ward Leonard generator; means for driving said generator; and a plurality of motors selectively actuated by said generator and in parallel with respect to the generator, each motor being independently controlled.

7. In an excavating machine, the combination of: a Ward Leonard generator; a plurality of motors selectively actuated by said generator; a second Ward Leonard generator; a second plurality of motors selectively actuated by said second generator; a single means for driving said generators; means connected with the first generator for limiting its power output; and means connected with the second generator for actuating said last named means during such time as the power output of said second generator is greater than a predetermined quantity.

8. In an excavating machine, the combination of: a Ward Leonard generator; a plurality of motors selectively actuated by said generator; a second Ward Leonard generator; a second plurality of motors selectively actuated by said second generator; a single means for driving said generators; and means whereby the combined power output of the two generators is limited to a certain predetermined maximum.

9. In an excavating machine, the combination of: a Ward Leonard generator; a motor actuated by said generator; a second Ward Leonard generator; a second motor actuated by said second generator; a single means for driving said generators; means connected with the first generator for limiting its power output; and means connected with the second generator for actuating said last named means during such time as the power output of said second generator is greater than a predetermined quantity.

10. In an excavating machine, the combination of: a Ward Leonard generator; a motor actuated by said generator; a second Ward Leonard generator; a second motor actuated by said second generator; a single means for driving said generators; and means whereby the combined power output of the two generators is limited to a certain predetermined maximum.

11. In an excavating machine, the combination of: a Ward Leonard generator; means for driving said generator; a plurality of motors selectively actuated by said generator; and interlocking means whereby, when one motor is being actuated, it is rendered impossible to couple any other motor to the generator, and whereby any attempt to couple any other motor to the generator is prevented from affecting the operation of the motor which is being actuated.

12. In an excavating machine, the combination of: a Ward Leonard generator; means for driving said generator; a plurality of motors selectively actuated by said generator; and interlocking means whereby it is rendered impossible to actuate more than one of said motors simultaneously by said generator, and whereby any attempt to actuate more than one motor simultaneously is prevented from affecting that motor which is first to be actuated.

13. In an excavating machine, the combination of: two Ward Leonard generators; a motor capable of being actuated only by one of said generators; a second motor capable of being actuated only by the other of said generators; a third motor capable of being actuated by either of said generators; a switch to couple said third motor selectively to either of said generators; complete independent control means for each motor; means whereby it is rendered impossible to actuate more than one of said motors simultaneously by one and the same generator; a single means for driving said generators; means connected with the first generator for limiting its power output; and means connected with the second generator for actuating said last named means during such time as the power output of said second generator is greater than a predetermined quantity.

14. In an excavating machine, the combination of: two Ward Leonard generators; a motor capable of being actuated only by one of said generators; a second motor capable of being actuated only by the other of said generators; a third motor capable of being actuated by either of said generators; a switch to couple said third motor selectively to either of said generators; complete independent control means for each motor; means whereby it is rendered impossible to actuate more than one of said motors simultaneously by one and the same generator; a single means for driving said generators; and means whereby the combined power output of the two generators is limited to a certain predetermined maximum.

PAUL S. STEVENS.